United States Patent [19]

Hosaka

[11] Patent Number: 4,525,373
[45] Date of Patent: Jun. 25, 1985

[54] PROCESS FOR MANUFACTURING FLAVORED AND PATTERNED TOFU

[75] Inventor: Yaoji Hosaka, Yashio, Japan

[73] Assignee: Toyu Food Co-Operative Corporation, Saitama, Japan

[21] Appl. No.: 499,990

[22] Filed: Jun. 1, 1983

[30] Foreign Application Priority Data

Nov. 19, 1982 [JP] Japan .............................. 57-201843

[51] Int. Cl.³ .............................. A23P 1/00; B28B 1/26
[52] U.S. Cl. .................................. 426/634; 249/113; 425/84; 426/383; 426/512
[58] Field of Search ............... 426/634, 489, 490, 629, 426/383, 87, 512; 99/439; 425/84, 85; 249/113

[56] References Cited

U.S. PATENT DOCUMENTS 3,503,750  3/1970  Oeth et al. .......................... 426/512

FOREIGN PATENT DOCUMENTS 46-13664  12/1971  Japan .................................. 426/634
52-41344  10/1977  Japan .................................. 426/634
881992   11/1961  United Kingdom ................ 249/113
461521    5/1976  U.S.S.R. .............................. 425/84

Primary Examiner—George Yeung
Attorney, Agent, or Firm—Louis E. Marn

[57] ABSTRACT

This invention provides a flavored and patterned tofu and its manufacturing process, in which a desirable pattern is provided upon an overall or partial surface of the tofu and a desirable flavor is penetrated uniformly into the interior of the tofu. Thus, utilization of the tofu as a proteinaceous food is diversified further.

1 Claim, 11 Drawing Figures

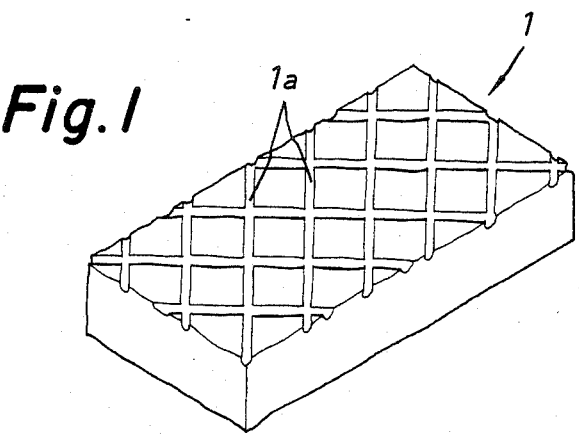
Fig.1
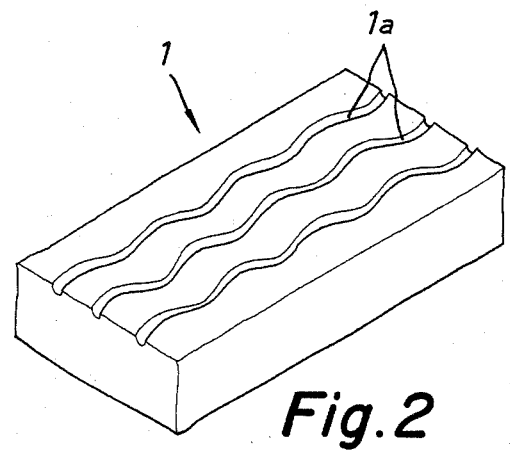
Fig.2
Fig.3
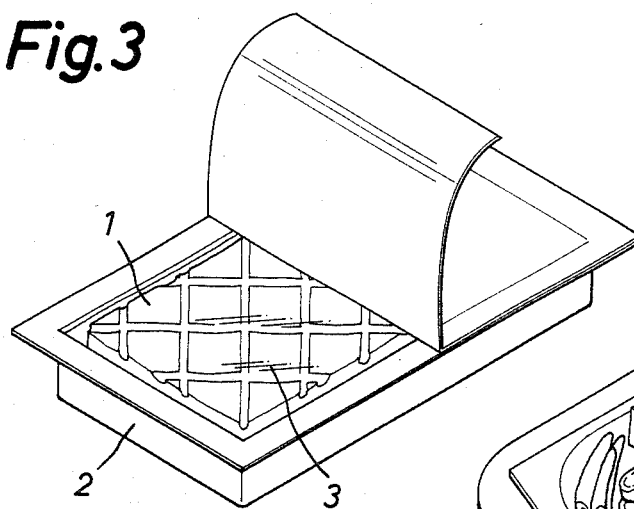
Fig.4
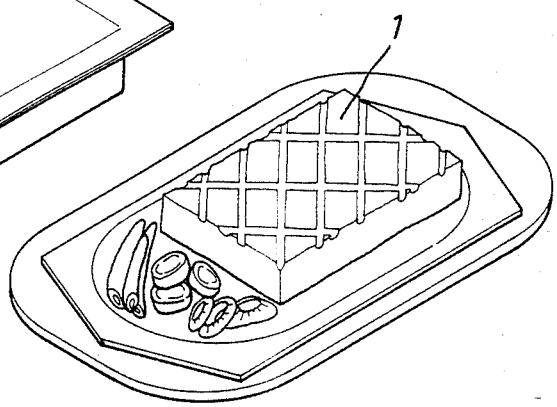
Fig.5
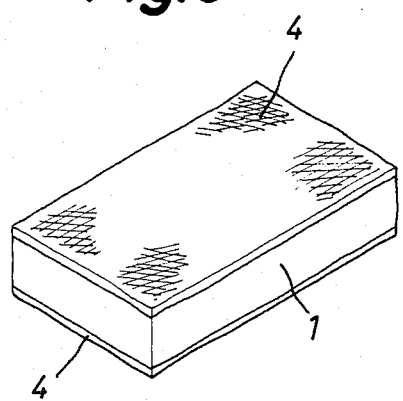
Fig.6
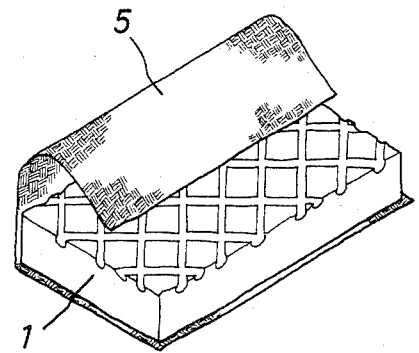

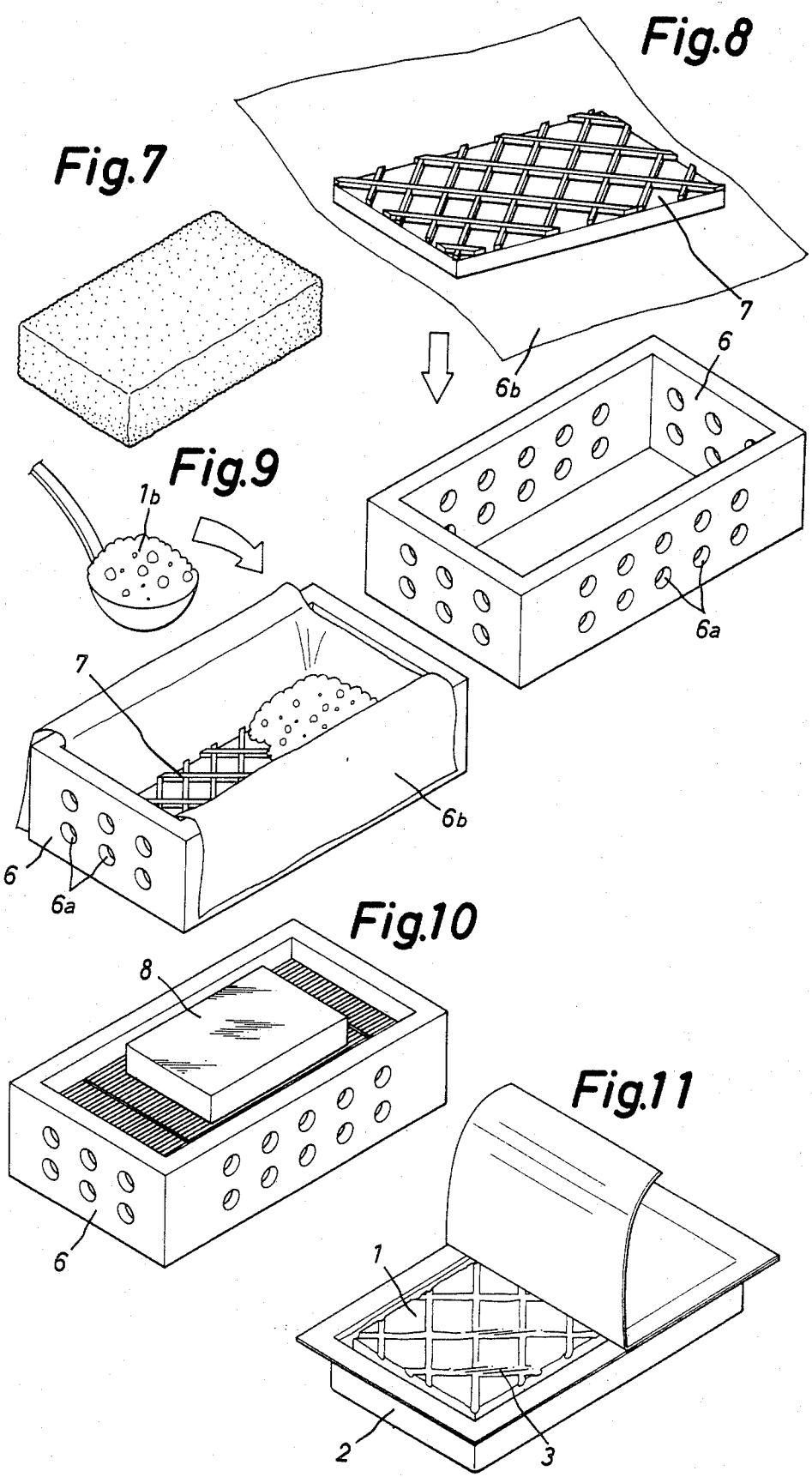

PROCESS FOR MANUFACTURING FLAVORED AND PATTERNED TOFU

BACKGROUND OF THE INVENTION

This invention relates to a flavored and patterned tofu and its manufacturing process, in which one unit of tofu may be provided with a desirable flavor and pattern for the purpose of enhancing further appetite.

The term "tofu" according to this invention is a Japanese food name and means a bean curd in other words.

The tofu is made of soybean and a very soft, rectangular and white subsidiary food.

Nowadays, since a vegetable protein content contained in the soybean is an amino acid composition, it is evaluated highly from the dietetic point of view as well as from the viewpoint of a health promotion. The soybean requires various kinds of processings. From this point of view, a Japanese traditional method for manufacturing the tofu is one of the most idealistic forms of the soybean processing. However, the cooking way of the conventional "tofu" is limited to a "yudofu", namely a "tofu" boiled in water, an additional food material for a Japanese "miso" soup (the word "miso" is a bean paste) or for a dish served in the pot, or the like.

Thus, the conventional tofu is not yet a universal food for people of all generations and countries.

BRIEF SUMMARY OF THE INVENTION

Accordingly, it is a general object of this invention to provide a flavored and patterned tofu as a finally accomplished food by diversifying utilization of the tofu, not to provide a conventional additional or subsidiary food material.

It is another object of this invention to provide a flavored and patterned tofu and its manufacturing method in order to promote a demand for the tofu as a proteinaceous food and thus contribute to betterment of the people's health.

Other features and advantages of this invention will become apparent from the following description taken in connection with the accompanying drawings.

BRIEF DESCRIPTION OF THE ACCOMPANYING DRAWINGS

FIG. 1 is a perspective view of an example of a tofu according to this invention;

FIG. 2 is a perspective view of another example of the tofu according to this invention;

FIG. 3 is a perspective view showing a packing condition of the tofu according to this invention;

FIGS. 4 to 7 are views showing utilization of the tofu according to this invention;

FIGS. 8 to 11 are views showing an example of a process for manufacturing the tofu according to this invention.

DETAILED DESCRIPTION OF THE INVENTION

Preferred examples of this invention will now be described with reference to the accompanying drawings.

The tofu as claimed in claim 1 of this invention is, on its surface, provided with a desirable flavor and pattern. It is eatable as it is, and usable as a material of the conventional various cookings.

Referring first to FIG. 1, numeral 1 denotes a tofu, on which top surface is provided a latticed pattern 1a. The tofu 1 as a final product is packed in a plastic pack 2 as shown in FIG. 3 and immersed in a solution 3 having a desired flavor. As a result, such a flavored solution 3 is fully penetrated into the interior of the tofu due to osmosis.

According to this Example, the tofu is well-seasoned with a small quantity of salt. Further, it is optional to select a desired pattern not only on the top surface of the tofu, but also on the overall or partial surface thereof.

FIG. 4 shows an example of practical application of the flavored and patterned tofu 1 according to this invention. It is grilled on a steel plate and prepared like a beefsteak.

In FIG. 5 the tofu 1 is sandwiched by a thinly, fried egg 4. In FIG. 6 it is rolled in dried layer. As shown in FIG. 7, such a flavored tofu 1 may be fried. In this way, it may be utilized in various forms.

A process for manufacturing the flavored and patterned tofu will now be described with FIGS. 8 and 9.

As shown in FIGS. 8 and 9, there is prepared a box-like form 6 of which upper and lower portions are opened and of which four sides are provided with a plurality of apertures 6a for discharging a water content of a tofu material 1b. Subsequently, a cotton cloth 6b is placed on the inside of the boxlike form 6. Then, a plate 7 having a latticed pattern thereon is mounted upon a bottom of the form 6 as shown in FIG. 9. After that, the coagulated tofu material is transferred into the form 6 with a spoon. It is produced by adding a coagulating agent to a soybean soup. Then, a weight 8 is loaded on the top surface of the tofu material 1b as shown in FIG. 10.

Further, after having placed the coagulated tofu material 1b on the bottom of the boxlike form 6, it is possible to mount the plate 7 having a latticed pattern upon the tofu material and apply a certain pressure by the weight 8. Further, it is very easy to provide a certain pattern on the side of the tofu by the aforementioned method. Still further, the latticed plate 7 having a certain pattern may be made of wood or synthetic resin.

A process for providing the tofu with a flavor will now be described.

A piece of tofu 1 provided with a pattern treatment is taken out of the boxlike form and cut into a number of pieces each having the size of 14 cm (length)×6 cm (width)×2.5 cm (thickness). As shown in FIG. 11, each tofu 1 is incorporated in the plastic pack 2 and the solution 3 having a desired flavor is poured into the plastic pack 2. As a result, the desired flavor is penetrated uniformly into the interior of the tofu unit 1 for about 25 hours due to osmosis or a capillary phenomenon. The flavored solution used in this example comprises about 1.4% of salt, and about 3.3% of a protein and fatty substance.

After lapse of about 25 hour immersion of the tofu in the flavored solution 3, about half quantity of it was penetrated into the interior of the tofu. It is of course optional to make a desirable flavor or taste by arranging seasonings.

Thus, this invention has succeeded in diversifying utilization of the tofu as a healthy food. Further, the process for providing a desirable flavor and pattern is very simple. The flavor treatment is made simply by immersing the tofu in the flavored solution. Accordingly, the cost for manufacturing a flavored and patterned tofu is very low.

What is claimed is:

1. A process for manufacturing a flavored and patterned tofu, the steps comprising:

preparing a tofu material by adding a coagulating agent to a soybean soup;

placing said prepared tofu material upon a pattern-mounted plate which is disposed in a bottom of a perforated container;

placing a weight upon a surface of said prepared tofu material in said container, thereby pressing said surface against said pattern-mounted plate by pressure of the weight to provide a predetermined pattern on the surface of said tofu material;

cutting the tofu material provided with such a pattern treatment into a number of pieces;

positioning one piece of tofu in a plastic pack;

pouring a solution having a flavor into the plastic pack to immerse said one piece of tofu therein; and sealing said plastic pack, said tofu piece remains in said sealed plastic pack for a predetemined period of time whereby the flavor is penetrated into the interior of the tofu piece.

* * * * *

UNITED STATES PATENT AND TRADEMARK OFFICE
CERTIFICATE OF CORRECTION

PATENT NO. : 4,525,373
DATED : June 25, 1985
INVENTOR(S) : Yaoji Hosaka

It is certified that error appears in the above-identified patent and that said Letters Patent is hereby corrected as shown below:

Col. 2, line 15, after "thinly", delete ",".

Signed and Sealed this

First Day of October 1985

[SEAL]

Attest:

Attesting Officer

DONALD J. QUIGG

Commissioner of Patents and Trademarks—Designate